H. E. REEVE.
THERMOSTAT.
APPLICATION FILED SEPT. 11, 1913.

1,091,764.

Patented Mar. 31, 1914.

WITNESSES

INVENTOR
Henry E. Reeve,
ATTORNEY

UNITED STATES PATENT OFFICE.

HENRY E. REEVE, OF NEW YORK, N. Y.

THERMOSTAT.

1,091,764. Specification of Letters Patent. Patented Mar. 31, 1914.

Application filed September 11, 1913. Serial No. 789,263.

*To all whom it may concern:*

Be it known that I, HENRY E. REEVE, a citizen of the United States of America, and residing at New York, in the county of Kings and State of New York, have invented new and useful Improvements in Thermostats, of which the following is a specification.

In thermostatic constructions it is of the greatest importance that the device operate quickly and with certainty. It is customary to have a bimetallic thermostatic element in the electric circuit which is adapted to be \rped with a change of temperature. I nave found that when a device of the ordinary character is subjected to a quick rise in temperature it does not act as promptly as is desirable.

It is the principal object of my present invention to provide a construction which will operate with a maximum speed upon a sudden rise of temperature.

Another object is to provide a simple, light and at the same time rigid form of construction for supporting a thermostatic arm, and one which may be readily manufactured.

It is customary to form the thermostatic element of brass and steel, a layer of brass being united to a layer of steel. The brass having a greater coefficient of expansion than the steel, change of temperature causes the arm to warp. It has also been customary to form the supports for the thermostatic elements of ordinary sheet metal such as ordinary steel. By reason of the mechanical features of construction the support is of greater mass than the thermostatic arm. Also a considerable portion of the support is usually coated with a waterproof enamel and is consequently more or less protected from the influence of a sudden rise of temperature in the external air surrounding the thermostat. From my experiments I have ascertained that the sluggishness of the thermostatic element during quick rise in temperature is due to the fact that the necessarily more massive support absorbs heat from the thermostatic element and thus prevents the thermostatic element from heating as quickly as it should. I have discovered that this difficulty may be overcome by interposing a metallic element having a low co-efficient of thermal conductivity between the support and the thermostatic arm.

A suitable metal for this purpose is a nickel steel alloy, for instance, of 35% nickel. This element may be termed a thermal insulator.

The accompanying drawing and specification show and describe one form of device embodying the improvements of my invention.

Figure 1:
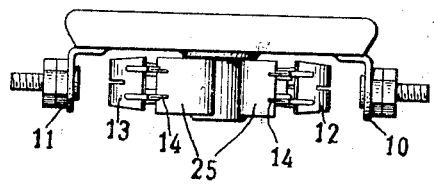
Figure 2:
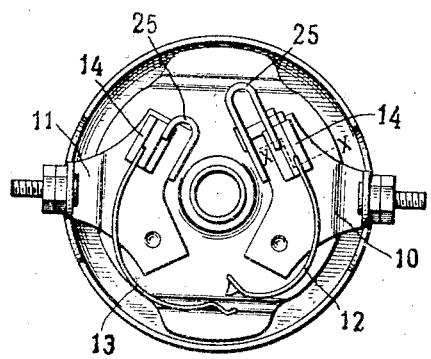
Figure 3:
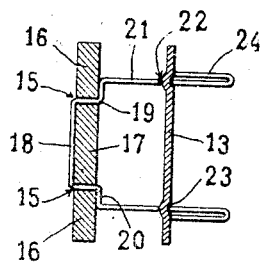
Figure 4:
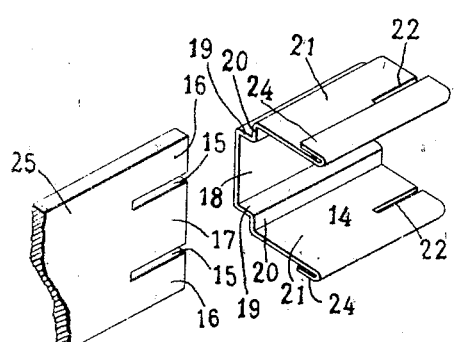

Figure 1, is a side view of the thermostat. Fig. 2, is a bottom plan view of the same. Fig. 3, is a sectional view on the plane of the line X, X of Fig. 2 on an enlarged scale. Fig. 4, is a perspective view of the support, the thermal insulator and the thermostatic arm, on an enlarged scale.

The circuit terminals 10 and 11 are suitably supported and they are insulated from each other in any suitable manner. In the form shown the circuit terminals have thermostatic arms such as 12 and 13 and a thermal insulator 14 is interposed between each arm and its support 25.

In the construction illustrated the supports are formed integral with the circuit terminals and each support is slotted as at 15, 15 which divides it into three parts 16, 16 and 17. The thermal insulator has a vertical wall 18, two flanges 19, 19, two vertical walls 20, 20 and flanges 21, 21. The flanges 19, 19 fit in the slots 15, 15 and the walls 18 and 20 lie against the parts 17 and 16 respectively of the support. The flanges 21, 21 are slotted as at 22, 22 to receive the larger end of the tapered bimetallic arm 13. The base of the arm is preferably corrugated or grooved as at 23 to afford a better connection with the walls of the slots 22, 22. The flanges 21, 21 of the thermal insulator 14 are in the form shown bent double at 24 for stiffening the member. The thermostatic element is preferably slotted as at 25 along the greater part of its central line so as to divide the arm into two parts and prevent it from buckling transversely when expanding under heat conditions. In addition to the close fitting engagement of the member 14 in the slots 15, 15 and of the thermostatic element in the slots 22, 22 the parts may be soldered together if desired for still greater security.

On account of its greater mass the support will naturally heat up slower than the thermostatic arm and the weatherproof enamel with which the support is usually coated form in effect a heat insulating jacket which adds further to the slow heating qualities of the support. Upon a sudden rise in temperature therefore, the thermostatic arm heats up rapidly while the support remains relatively cool. This relatively cool support of greater mass possesses the inherent ability of absorbing heat from the smaller more heat-responsive body of the thermostatic arm but absorption of heat from the arm by the support is practically prevented by the thermal insulator which is interposed between the arm and support. The arm being thus thermally insulated from and in this sense independent of its support, leakage of heat from the arm to the support is prevented and consequently the arm receives the maximum effect of a change in temperature without being affected by its manner of support. The use of the thermal insulators is particularly effective in a thermostat of the type illustrated in which two thermostatic arms are employed, because the arms in this type of device are relatively short and any loss of heat through absorption or conduction is naturally more noticeable where the thermostatic arms are short than it would be where the arms are longer. Also having two anchorages practically doubles the tendency to heat transference or leakage.

I have found that the use of a thermal insulator between the thermostatic element and its support in some cases increases the speed of operation of the device as much as one minute and in all cases increases the speed of operation materially, especially under the conditions existing in case of fire such for instance, as an increase in temperature of fifteen degrees F. per minute.

What I claim is:—

1. In a thermostat, a thermostatic arm and a support therefor including a thermal insulating element of nickel steel.

2. In a thermostat, a slotted support, a sheet metal member having a central wall, two walls laterally spaced apart therefrom but parallel thereto and connected by flanges substantially at right angles fitting in the slots in said support and a thermostatic element secured to said sheet metal member.

3. In a thermostat, a sheet metal member having parallel flanges with slots in said flanges and a thermostatic element secured in said slots.

4. In a thermostat, a sheet metal member having parallel flanges with slots in said flanges and a thermostatic element having its end portion grooved to fit into the slots in the parallel flanges.

5. In a thermostat, a support having a slotted end, a supporting member engaged in the slotted end of the support, said supporting member having flanges outstanding from the support and slotted to receive a thermostatic arm and a thermostatic arm engaged in the slotted outstanding flanges of the supporting member.

6. In a thermostat, a support provided with slots therein, a supporting member having flanged portions engaged in the slots in the support, said member having longitudinal slots therein, and a thermostatic arm having longitudinal grooves in the end of the same to fit the longitudinal slots in the supporting member.

7. In a thermostat, a pair of relatively short thermostatic arms arranged to make engagement under certain thermal conditions, supports for said arms and thermal insulators conductive to electricity interposed between the arms and their respective supports.

8. In a thermostat, a thermostatic element, a support for said element and a member interposed between the thermostatic element and its support conductive to electricity but having a relatively low co-efficient of thermal conductivity.

9. In a thermostat, a thermostatic arm, a support therefor and a thermal insulating member conductive to electricity interposed between the arm and its support having a slotted connection with the support and a slotted connection with the arm.

10. In a thermostat, the combination with a member having spaced substantially parallel walls slotted longitudinally and provided with reinforcing flanges at the edges thereof, of a thermostatic arm having its end portion engaged in the slots in the said spaced walls.

HENRY E. REEVE.

Witnesses:
J. GILMAN,
K. S. ALLYN.